Feb. 18, 1964     L. J. FUNKE ETAL     3,121,385
SANDWICH GRILLS
Filed March 14, 1958     3 Sheets-Sheet 1
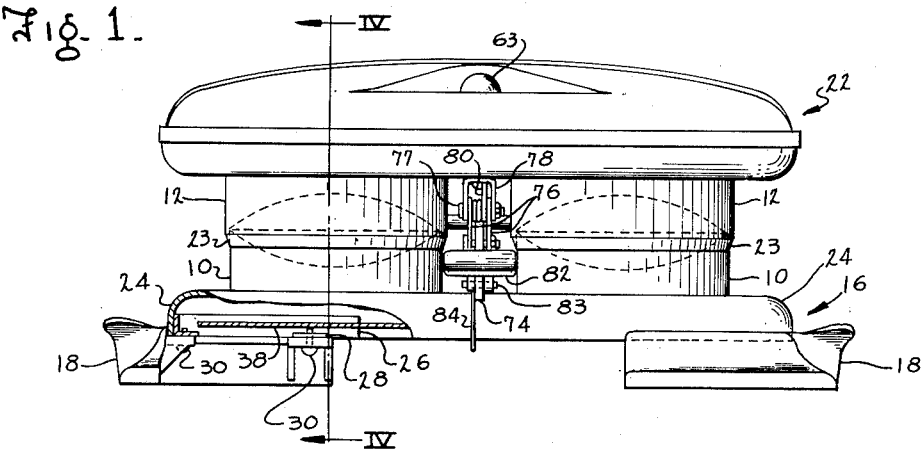
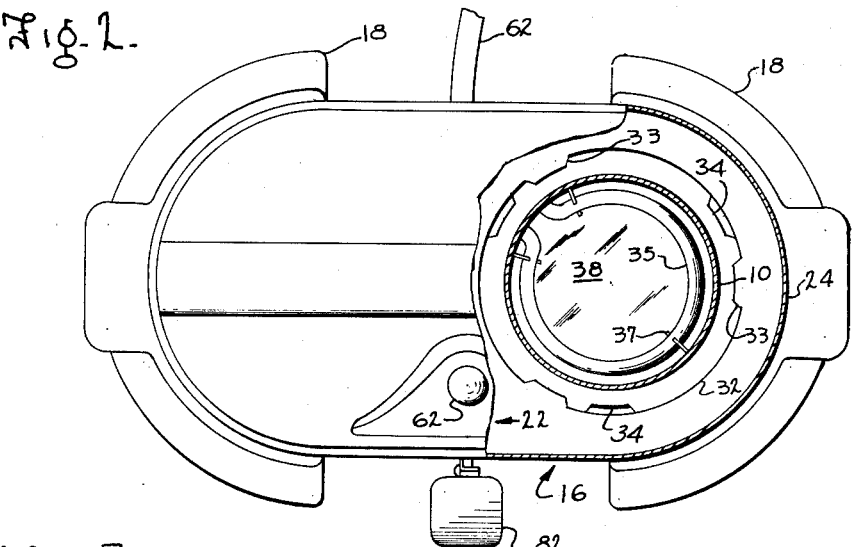
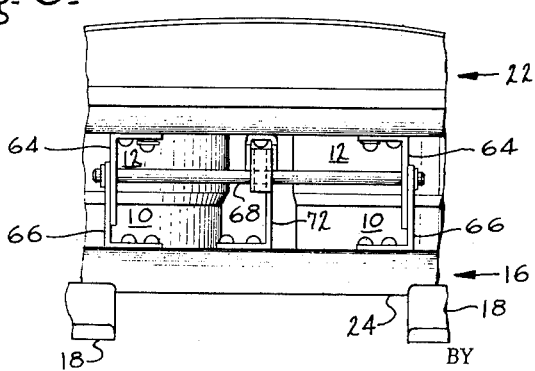
INVENTORS
LAWRENCE J. FUNKE
FELIX BLACKBURN
BY Chapin & Neal
ATTORNEYS Feb. 18, 1964   L. J. FUNKE ETAL   3,121,385
SANDWICH GRILLS
Filed March 14, 1958   3 Sheets-Sheet 2

INVENTORS
LAWRENCE J. FUNKE
FELIX BLACKBURN

BY   Chapin & Neal

ATTORNEYS

INVENTORS
LAWRENCE J. FUNKE
FELIX BLACKBURN

BY Chapin & Neal

ATTORNEYS

United States Patent Office 3,121,385
Patented Feb. 18, 1964

3,121,385
SANDWICH GRILLS
Lawrence J. Funke, 44 Cooley Drive, Longmeadow, Mass., and Felix Blackburn, Agawan, Mass.; said Blackburn assignor to said Funke; Frances Marjorie Funke, executrix of said Lawrence J. Funke, deceased
Filed Mar. 14, 1958, Ser. No. 721,598
9 Claims. (Cl. 99—374)

The present invention relates to sandwich grills and more particularly to improvements in that type of grill wherein two slices of bread are compressed between heated cup-shaped members or molds to toast the bread and heat or melt sandwich filler material therebetween. This application is a continuation-in-part of our copending application Serial No. 643,116, filed Feb. 28, 1957, now abandoned.

In grills of this type, the bread is compressed by the marginal edge portions of cooperating cup-shaped members to seal in the sandwich filler material. These members are also generally provided with flange means which shear off the crusts of the bread to produce a unique toasted circular sandwich peculiar to this type of grill.

The primary object of our invention is to make such a grill practical as an electrical appliance for home use.

A more specific object of our invention is to provide improved means for bringing the heated cups into and out of cooperative relation and thereby providing an effective leverage system for shearing off the crusts of bread and compressing the marginal edge portions of the bread between the cups. These means, in accordance with another object of the invention lend to an economical and space saving mode of construction which is greatly desirable in the highly competitive field of home appliance.

Among the features of the invention are a novel relative arrangement of the cups and an operating linkage capable of bringing the cups into and out of sandwich making relation in a manner which enables the crusts of the bread to be sheared in a progressive fashion and further enables the marginal edge portions of the bread to be compressed in progressive fashion.

The above and other related objects and features of our invention will be apparent from a reading of the following description of the disclosure found in the accompanying drawings, and the particular novelty thereof pointed out in the appended claims.

In the drawings:

FIG. 1 is an elevation of a sandwich toaster embodying the present invention parts being broken away;

FIG. 2 is a plan view of the toaster seen in FIG. 1 parts being broken away;

FIG. 3 is a fragmentary rear elevation of the toaster seen in FIG. 1;

Figure 4:
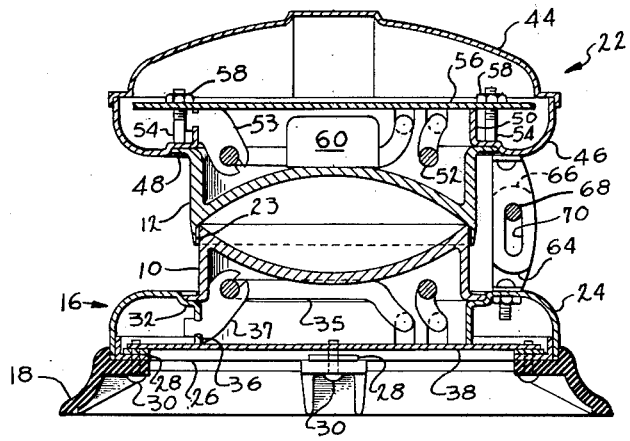
FIG. 4 is a section taken substantially on line IV—IV, in FIG. 1.

The toaster of the present invention comprises two pairs of heated cups 10 and 12 disposed in side by side relationship and arranged to grill sandwich material placed therebetween in the operative or cooking position of the toaster illustrated in FIG. 1. The lower cups 10 are mounted on a compositely formed base 16 which may be supported on a work surface by pedestals 18. The upper cups 12 are mounted on a compositely formed cover or top member 22. The cover 22 is hingedly connected to the base 16 in a novel manner and a centrally disposed lever 74 is provided to move the upper cups 12 between an inoperative or loading position best illustrated in FIG. 6 and the cooking position of FIG. 1. With the cups 12 in the loading position of FIG. 6 two slices of bread may be placed on each of the lower cups 10 with filler material disposed between the slices generally central of the cups 10. As the cups 12 are brought to the cooking position, the crusts of the bread will be sheared off by cylindrical flanges 23 extending from the upper cups 12 and a circular sandwich portion died out in a manner more fully described below. At the same time, the marginal edge portions of the sandwiches within the cups 10 and 12 will be sealed together as the sandwiches are toasted or grilled. After the sandwiches are fully grilled the cups 12 may again be moved to their inoperative positions and the finished or cooked circular sandwiches removed.

Referring now to FIGS. 1 and 4, it will be seen that the base 16 may comprise a sheet metal stamping 24 formed with a depending flange. At each end of the stamping 24 (FIGS. 1–4), a mounting strap 26 is secured as by brazing to the inner surfaces of the stamping flange. Tabs 28 extend inwardly from the straps 26 and threadably receive screws 30 which secure the pedestals 18 to the base 16.

The cups 10 are detachably secured to the base 16 in the following manner. Each cup 10 is formed with a radial flange 32 (FIGS. 2–4) which is received in an appropriate recess formed in the stamping 24. Further tabs 33 extend over the recesses in the stamping 24 to retain the cups 10 in place. Notches 34 are formed in the flanges 32, whereby the flanges 32 may be seated in the recesses in the stamping 24 and then rotated to lock the cups 10 on the base 16 in bayonet fashion.

Each cup 10 is heated by a sheathed electrical resistance heating coil 35 which is supported within an opening formed in the stamping 24 beneath each cup 10 and defined by a circular skirt 36. Tabs 37 extend from the skirt 36 to provide support for the coil 35. A plate 38 is secured to certain of the strap tabs 28 by respective screws 30 to provide a bottom cover for the base 16. The plate 38 also serves as a reflector for directing the heat from coils 35 toward the cups 10 thus protecting the surface on which the toaster is placed as well as minimizing the amount of current required for the coils 35.

The cover 22 comprises a top stamping 44 and a lower stamping 46 appropriately joined together (FIG. 4). The means for attaching the cups 12 to the lower stamping 46 are essentially the same as the bayonet-type means for mounting the cups 10 on the stamping 24. Thus the top stamping 46 is recessed to receive flanges 48 at the upper ends of cups 12, the flanges 48 being notched to pass over projections overlying said recess. The flanges 48 may be seated on the respective recesses and the cups rotated to secure them to the cover 22. In a manner similar to the construction of the base, openings, defined by a flange 50, are provided in the stamping 46 above each cup 12. An insulated electrical resistance heating coil 52 is mounted above each of the cups 12, being supported by tabs 53 extending from the flange 50. Posts 54 extend upwardly from the stamping 46 and provide means for mounting a reflector plate 56 by way of nuts 58. The reflector plate 56 directs heat from the coil 52 back to the cups 12 and provides in combination with the stamping 44 and 46 two air cells which minimize the temperature of the upper surface of the cover 22.

A thermostat 60 may be mounted interiorly of the lid 22 in contacting relationship with one of the upper cups 12. Electric current is supplied to the various heating elements by way of a cord 62 which is connected to the elements 35 and 52 in conventional fashion with the thermostat 60 being connected in series therewith to prevent overheating of the various cups. Also connected in series with the electrical circuit is a neon light 63 (FIG. 2) of conventional type which may be mounted in a recessed portion of the top stamping 44 and which will indicate when current has been shut off by the thermostat 60 and the cups are heated to a temperature sufficient for toasting sandwiches.

The hinged connection between the lid 22 and base 16 may comprise a pair of depending ears 64 (FIGS. 3–4) secured to and extending from the lower surface of the cover stamping 46 and a pair of projections 66 secured to the base stamping 24 and extending upwardly in overlapping relationship with the ears 64. The projections 66 are apertured to receive a pivot rod 68 which extends therebetween while the ears 64 are slotted as at 70 normally of the cover 22 to receive the rod 68. A further projection or support 72 is secured to the base stamping 24 and extends upwardly to provide an intermediate support for the pivot rod 68. The upper end of projection 72 is folded into U-shape to receive the rod 68 at two spaced points for purposes which later appear.

The operating lever 74 is pivotally mounted at its rear end on the pivot rod 68 and extends forwardly of the base 16 between the pairs of cups 10 and 12. The rear end of the lever 74 is positioned axially of the rod 68 by being captured between the U-shaped portion of support 72. A linkage connection is made between the lever 74 and the lid 22 in the following manner. A pair of links 76 are pivotally connected at their lower ends to the lever 74 and at their upper ends to a pin 77 extending between the arms of a bracket 78 secured to the underside of the lid 22. A torsion spring 80 is coiled around the pin 77 with one leg hooked under the lever 74 and the other end bearing against the lid 22 to at all times urge the forward end of the lever 74 towards the lid 22.

An operating knob or fulcrum pad 82 is bifurcated to receive the outer end of lever 74 and pivotally mounted thereon by way of pin 83. Also mounted on the outer end of said lever but inwardly of the pad 82 is a hook 84 which is arranged under the influence of gravity to swing inwardly and engage the under edge of the stamping 24 to hold the lid 22 in its closed or cooking position. It will be seen that the pad 82 may be pivoted to engage the upper end of the hook 84 and swing the hook outwardly of the stamping 24 to permit the cover to be raised.

Figure 5:
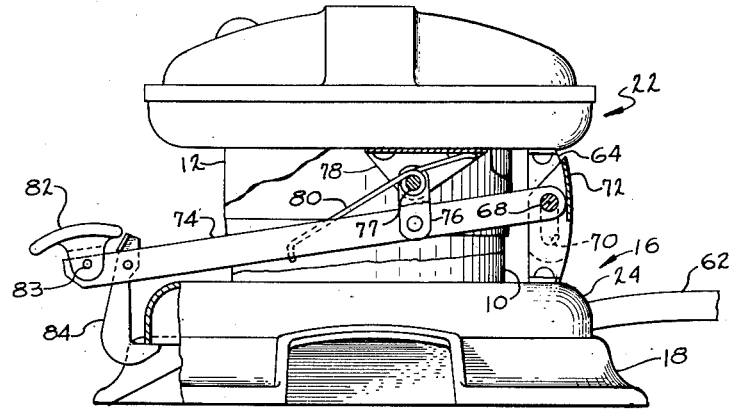
FIG. 5 is a side elevation with certain portions broken away of the toaster seen in FIG. 1.
Figure 6:
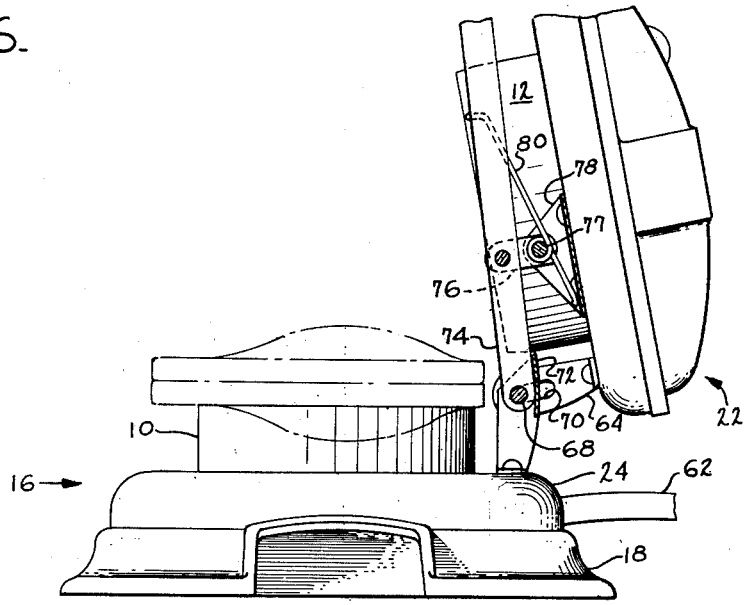
FIG. 6 is a side elevation of the toaster with certain portions broken away and showing the lid member thereof in a fully open position.
Figure 7:
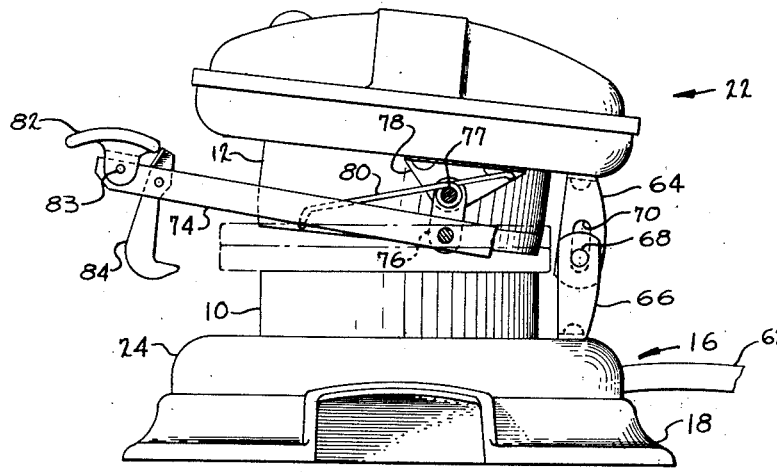
FIG. 7 is a view similar to FIG. 6 but showing the covering member in a partially closed position.

The functioning of the hinged connection between the cover 22 and the base 16 may best be appreciated by a comparison of FIGS. 5, 6, and 7. In FIG. 5 the toaster is illustrated in its cooking position. When it is desired to remove a finished sandwich or to start the cooking of a sandwich, the pad 82 is tilted to disengage the locking hook 84 and the lid then swung upwardly to the open position illustrated in FIG. 6. In so swinging the cover 22, the ears 64 will be shifted in a longitudinal sense relative to the pivot rod 68 under the influence of the spring 80, i.e. in the closed position of the lid 22, the rod 68 is disposed at the upper ends of the slots 70 whereas in the open position of the lid 22, the rod is disposed at the bottom, or substantially so of the slots 70. This shifting action is of no particular consequence in swinging the cover from its closed to its open position, however, it is of great importance in swinging the lid back to its closed position, as will later appear. It will be also appreciated from FIG. 6 that the bridge of the U-shaped portion of projection 72 provides a stop which will maintain the lid 22 in its open position. It will be noted that pivot rod 68 is preferably disposed above the level of the base cups 10 to provide room for pieces of buttered bread or the like which may be placed thereon as indicated by the phantom showing when the cups 10 and 12 are at the proper temperature. Between each two slices of bread some filler material, such as cheese may be centered with respect to the cups 10. The lid 22 is then swung downwardly to bring the cups 12 into cooperative relationship with the cups 10. FIG. 7 illustrates an intermediate position of the cups 12 wherein it will be noted that the rear portions of the cup flanges 23 have begun to shear off the bread. In this position of initial contact, the pivot rod 68 is still disposed at or adjacent to the lower ends of the slots 70. As pressure is exerted on the outer end of the lever 74, the flanges of cups 12 will shear or bite through the bread and die out a central circular section therefrom, this shearing action being progressive from the rear to the front of the cup due in part to the links 76 being disposed to the rear of the center of said cups. During or after the bread has been sheared at the rear portions of the cups, it will be compressed at this point whereby continuing pressure on the lever 74 will tend to lower the front edges of the cups 12 thereby progressively shearing the bread from the rear of the cups to the front of the cups as the slot 188 shifts to bring its upper end into engagement with the pivot rod 68. When the bread is substantially sheared, the force of compressing the marginal edge portions of the bread at the front of the cups increases to a point where continued further pressure on the lever 74 will cause the rear edges of the cups to complete the necessary compressing action and the cups will then be rocked to complete the compressing action in a progressive manner, this being accomplished when the cups are in their cooking position as illustrated in FIG. 5, whereupon the hook 84 will automatically drop into a locking position and the lever 774 may be released. It will be noted that sufficient clearance is provided between the flange 23 of the upper cups and the lower cups 10 to accommodate this rocking movement.

It will also be noted that the spring 80 could be made relatively much stronger in which case the progressive shearing actions above-described would be reversed, i.e. the shearing and compressing action would begin at the front edges of the cups 20 and then progress toward the rear of the cups. Another point to note is that much the same progressive shearing action could be obtained if the pivot rod 68 were fixed relative to the ears 64 and a vertical slot were formed in each projection 66 to receive the rod 68.

In either event, the leverage advantage provided is sufficient to effect both the cutting and compressing of the bread with only moderate physical effort on the part of the user of the toaster. Thus, this end is accomplished in an extremely simple manner requiring neither gears nor bell cranks nor any other relatively expensive methods of obtaining a leverage advantage.

The sandwiches produced on this machine may run practically throughout the whole gamut of a person's imagination and may include any and all conventional sandwich filler materials. Further, it has been found that a very tasty food product is obtainable by putting fresh or canned fruit between the bread and cooking it in the same manner as a sandwich. The end result is quite similar to a pie or tart and is especially delicious when coated with powdered sugar. It will also be apparent that the cups 10 and 12, being detachable, could be replaced by other cups having heated cooking surfaces of different form.

Having thus described our invention, what is considered novel and desired to be secured by Letters Patent of the United States is:

1. A sandwich grill comprising a base on which a first pair of cups are detachably mounted in side-by-side relation, a cover having a second pair of cups detachably secured thereto in side-by-side relation and in opposed relation to the first pair of cups when the cover overlies the base, means for heating said cups, the cups of at least one pair of cups having flanges for shearing bread or the like placed between the respective opposed cups, means for mounting said cover on said base, said mounting means including a pair of spaced uprights extending from the rear of the base, a pivot rod extending therebetween and spaced above the base cups, a pair of ears extending from said cover, said ears having slots extending normally of the cover and receiving said pivot rod, a lever disposed between said cover cups for moving said cover between an operative or cooking position wherein the base cups and cover cups are in said opposed relation and an open position wherein the cover is a sufficient distance from the base cups to permit ready insertion of sandwich materials on the base cups, said lever being swingably mounted on said pivot rod and connected to said cover by a link disposed rearwardly of the central portion of said cups, said link being pivotally connected at one end to the lever and at the other end to said cover.

2. A sandwich grill comprising a base on which a first pair of cups are detachably mounted in side-by-side relation, a cover having a second pair of cups detachably secured thereto in side-by-side relation and in opposed relation to the first pair of cups when the cover overlies the base, at least one pair of cups having flanges for shearing bread or the like placed between respective opposed cups, means for heating said cups, means for mounting said cover on said base, said mounting means including a pair of spaced uprights extending from the rear of the base, a pivot rod extending therebetween and spaced above the base cups, a pair of ears extending from said cover, said ears having slots extending normally of the cover and receiving said pivot rod, a lever for moving said cover between an operative position wherein the base cups and cover cups are in said opposed relation in the operative or cooking position thereof and an open position wherein the cover is a sufficient distance from the base cups to permit ready insertion of sandwich materials on the base cups, said lever being swingably mounted on said pivot rod and connected to said cover by a link disposed rearwardly of the center of said cups, said link being pivotally connected at one end to the lever and at the other end to the cover, relatively strong spring means urging said lever toward said cover when the lever is lowered to bring the cover from its open to its operative position the front portions of the cup flanges will first shear sandwich material placed on the base cups then the flanges will be rocked against the action of said spring to progressively shear the sandwich material all as the slotted ears slide relative to said pivot rod, and a pivotal latch carried at the outer end of said lever and engagable with an undercut portion of said base to maintain said cover in its operative position.

3. A sandwich grill comprising a base on which a cup is detachably mounted, a second cover having a cup detachably secured thereto, means for heating said cups and means for mounting said cover on said base, said mounting means including an upright extending from the rear of the base, a pivot rod extending therefrom and spaced above the base cup, an ear extending from said cover, said ear having a slot extending normally of the cover and receiving said pivot rod, and a lever for moving said cover between an operative or cooking position wherein the base cup and cover cup are in opposed relation and an open position wherein the cover is a sufficient distance from the base cup to permit ready insertion of sandwich materials on the base cup, said lever being swingably mounted on said pivot rod and pivotally connected to said cover rearwardly of the center of said cover cup, relatively strong spring means urging said lever towards said cover whereby when the lever is lowered to bring the cover from its open to its operative position, the front portions of the cups will first be brought into engagement then progressively into their operative position against the action of said spring means all as the slotted ear slides relative to said pivot rod, and latch means for connecting the outer end of said lever to said base to maintain said cover in its operative position.

4. A toaster comprising two pairs of opposed cups, a base on which one pair of said cups is mounted, a cover on which the other pair of cups is mounted in opposed relationship, means for heating said cups, at least one of the respective opposed cups having a flange for shearing bread or the like placed therebetween, a lever for moving the cover between a cooking position wherein the cups are in opposed relation and an open position wherein the cover cups are displaced a distance sufficient for sandwich materials to be placed on the base cups, said lever being disposed between the pairs of cups and extending from the front to the rear of the cover, a pair of projections extending upwardly from said base rearwardly of the cups thereon, a second pair of projections extending from said cover and respectively overlapping the first pair of projections, a pivot rod extending between said projections and mounted on one pair of projections, the other pair of projections having slots for receiving said rod, said slots being vertically disposed at least when the cover is in its cooking position, said lever being swingably mounted on said rod and pivotally connected to said cover rearwardly of the center of said cups.

5. A toaster as in claim 4 wherein a support extends from said base intermediate the projections thereon, said support receiving said pivot rod, said support having a U-shaped portion between the legs of which the rear end of the lever is captured, the bridge of said U-shaped portion being generally vertically disposed rearwardly of the pivot rod to provide a stop for said lever and thereby define the open position of the cover.

6. A toaster as in claim 4 wherein relatively light spring means are provided for urging the front end of said lever towards said cover.

7. A toaster as in claim 6 wherein the pivotal connection between the lever and the cover comprises a U-shaped bracket secured to the undersurface of said cover and overlying said lever, a pin extending between the arms of said bracket, a pair of links one on each side of said lever, said links being pivotally mounted at their upper ends on said pin and pivotally connected at their lower ends to said lever, and said spring means comprising a torsion spring coiled about said pivot pin between said links, one end of said torsion spring being hooked under said lever and the other end bearing against the undersurface of said cover.

8. A toaster as in claim 6 wherein a knob is pivotally mounted on the front end of said lever and a latching hook is pivotally mounted on the lever inwardly of the knob, said hook being disposed to engage an undercut surface on the base and maintain the cover in its cooking position, said hook having an upper extension engageable by said knob to release the hook from the undercut portion of said base.

9. A sandwich grill comprising a base on which a first cup is mounted, a cover having a second cup secured thereto in opposed relation to the first cup when the cover overlies the base, at least one of said cups having a flange for shearing bread slices or the like placed between the opposed cups and for sealing said bread slices together along said sheared portion, means for heating said cups, means for pivotably mounting said cover on said base whereby said cover may be pivoted with respect to said base between an operative or cooking position wherein the first and second cups are in said opposed relation and an opened position wherein the cover is a sufficient distance from the base to permit ready insertion of bread slices on said first cup, said mounting means including a floating hinge assembly whereby said second cup may be rocked with respect to said first cup when said first and second cups are in said opposed relation, and an operating lever extending from the front to the rear of said cover for moving said cover between said opposed and open positions, means pivotally connecting said lever to said cover rearwardly of the center of said second cup, separate means pivotally connecting said lever to said floating hinge assembly for imparting to said second cup both swinging and rectilinear movement toward and away from said first cup in response to movement of said lever whereby said bread slices are progressively sheared and sealed as said cups are moved into said operative position.

References Cited in the file of this patent

UNITED STATES PATENTS

| | | |
|---|---|---|
| 750,445 | Forcke | Jan. 26, 1904 |
| 1,528,050 | Forshee | Mar. 3, 1925 |
| 1,950,385 | Burch | Mar. 13, 1934 |
| 2,033,060 | Anderson | Mar. 3, 1936 |
| 2,376,585 | Dickey | May 22, 1945 |
| 2,587,314 | Hall | Feb. 26, 1952 |
| 2,607,287 | Price | Aug. 19, 1952 |